United States Patent
Lee et al.

(10) Patent No.: US 9,070,909 B2
(45) Date of Patent: Jun. 30, 2015

(54) STACK FOR FUEL CELL SYSTEM

(75) Inventors: Jin-Hwa Lee, Yongin-si (KR);
Chi-Seung Lee, Jyunggi-do (KR);
Seong-Jin An, Yongin-si (KR); Sang-Il Han, Yongin-si (KR); Kah-Young Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1054 days.

(21) Appl. No.: 13/067,383

(22) Filed: May 27, 2011

(65) Prior Publication Data

US 2011/0305965 A1 Dec. 15, 2011

(30) Foreign Application Priority Data

Jun. 10, 2010 (KR) .................. 10-2010-0054974

(51) Int. Cl.
*H01M 2/38* (2006.01)
*H01M 8/02* (2006.01)

(52) U.S. Cl.
CPC ............ *H01M 8/0258* (2013.01); *H01M 8/026* (2013.01); *Y02E 60/50* (2013.01)

(58) Field of Classification Search
CPC ..... H01M 8/0258; H01M 8/026; Y02E 60/50
USPC ................................. 429/455, 513
See application file for complete search history.

(56) References Cited

U.S. PATENT DOCUMENTS 6,242,118 B1 * 6/2001 Grasso et al. .................. 429/428
6,635,378 B1 * 10/2003 Yang et al. ..................... 429/513

FOREIGN PATENT DOCUMENTS

| JP | 2006-228507 A | 8/2006 |
| JP | 2007-207571 | 8/2007 |
| JP | 2009-199914 A | 9/2009 |

* cited by examiner

*Primary Examiner* — Gary Harris
(74) *Attorney, Agent, or Firm* — Lee & Morse, P.C.

(57) ABSTRACT

A stack for a fuel cell system, including: a membrane electrode assembly, a separator that includes a fuel passage that supplies a fuel to an anode electrode of the membrane electrode assembly and an oxidant passage that supplies an oxidant to a cathode electrode of an adjacent membrane electrode assembly, a first manifold that is formed by connecting first penetration holes that penetrate the separator in a stacking direction and that is connected to the fuel passage, a second manifold that is formed by connecting second penetration holes that penetrate the separator in the stacking direction and that is connected to the oxidant passage and a baffle that is disposed in at least one of the first manifold and the second manifold. The baffle has a membrane structure to control the fluid flow inside of the at least one of the first manifold and the second manifold.

14 Claims, 7 Drawing Sheets

STACK FOR FUEL CELL SYSTEM

BACKGROUND

1. Field

This disclosure relates to a stack for a fuel cell system, which allows a fuel and oxidant to be flowed to fuel inflow and an oxidant inflow manifolds, respectively.

2. Description of the Related Art

A fuel cell system, such as, for example, a polymer electrolyte membrane fuel cell (PEMFC) system, uses a polymer electrolyte membrane having a hydrogen ion exchange characteristic, and optionally transports a reformed gas (or hydrogen) generated by reforming hydrocarboneous fuel such as methanol or natural gas, etc., oxidant, such as, for example, air containing oxygen to the polymer electrolyte membrane, so that a electrochemical reaction occurs and then power and heat are produced.

The fuel cell system includes a stack formed by stacking a plurality of unit cells that substantially produce power and heat, a fuel supplying unit that supplies a fuel containing hydrogen to the stack, and an oxidant supplying unit that supplies oxidant to the stack.

The unit cell includes a separator and a membrane electrode assembly (MEA) that has an anode electrode and a cathode electrode on both sides of a polymer electrolyte membrane that selectivity transports hydrogen ions. For example, the separator on the anode electrode includes a fuel passage that supplies a fuel to the anode electrode by connecting to the fuel supplying unit, and the separator on the cathode electrode includes an oxidant passage that supplies oxidant to the cathode electrode by connecting to the oxidant supplying unit.

The above information disclosed in this Background section is only for enhancement of understanding of the background of the invention and therefore it may contain information that does not form the prior art that is already known in this country to a person of ordinary skill in the art.

SUMMARY

Embodiments are directed to a fuel cell stack that substantially overcomes one or more of the problems due to the limitations and disadvantages of the related art.

It is a feature of an embodiment to provide a stack for a fuel cell system having advantages of allowing the distribution of a fuel or oxidant supplied to be uniform in a fuel inflow or oxidant inflow manifold, respectively.

At least one of the above and other features and advantages may be realized by providing a stack for a fuel cell system including a membrane electrode assembly that includes an anode electrode and a cathode electrode disposed on respective sides of a polymer electrolyte membrane, a separator that includes a fuel passage that supplies a fuel to the anode electrode disposed on one side of the membrane electrode assembly in a stacking direction, or an oxidant passage that supplies an oxidant to a cathode electrode disposed on the other side of the membrane electrode assembly in the stacking direction, and end plates disposed at respective ends of the stack in the stacking direction. The separator includes a first manifold formed by connecting first penetration holes that penetrate the separator in the stacking direction and that is connected to the fuel passage, a second manifold formed by connecting second penetration holes that penetrate the separator in the stacking direction and that is connected to the oxidant passage; and a baffle that is disposed in at least one of the first manifold and the second manifold, the baffle having a membrane structure and extending to the inside of the at least one of the first manifold and the second manifold.

The baffle may be made of a flexible material.

The baffle may be disposed between a pair of adjacent separators and is made of the same material as a gasket that seals the circumference of the membrane electrode assembly.

The baffle may be made of one or more of polyvinyl chloride and polyethylene terephthalate.

The baffle may include a first baffle member that is disposed in the first penetration hole of the first manifold, and a second baffle member that is disposed in the second penetration hole of the second manifold.

The separator may include a first separator member and a second separator member that are adhered to each other in the stacking direction and that form a coolant passage that extends between the first separator member and the second separator member perpendicular to the stacking direction, and one end of the baffle is disposed between the first separator member and the second separator member, and the other end of the baffle extends into the inside of at least one of the first manifold and the second manifold.

The first separator member may include the fuel passage on the opposite side of the first member from the coolant passage, and the second separator member may include the oxidant passage on the opposite side of the second separator member from the coolant passage.

At least one of the first manifold and the second manifold may form a quadrangle-shaped space in a plane perpendicular to the stacking direction, the baffle disposed in the manifold may comprise a single piece having a quadrangle shape and may be attached to the separator at one side of the quadrangle-shaped space, and an area of the baffle that extends into the at least one of the first manifold and the second manifold may be the same as the area of the quadrangle-shaped space.

At least one of the first manifold and the second manifold may form a quadrangle-shaped space in a plane perpendicular to the stacking direction, the baffle may include a first baffle portion and a second baffle portion that each have a bisected quadrangle shape and that are attached to the separator at opposite sides of the quadrangle-shaped space, and a combined area of the first and second baffle portions that extends into the at least one of the first manifold and the second manifold may be the same as the area of the quadrangle-shaped space.

At least one of the first manifold and the second manifold may form a quadrangle-shaped space in a plane perpendicular to the stacking direction, the baffle may include a first baffle portion, a second baffle portion, a third baffle portion and a fourth baffle portion that each have a triangle shape, each triangle shape corresponding to a quarter of the quadrangle-shaped space, each of the first, second, third and fourth baffle portions being attached to the separator at a respective side of the quadrangle-shaped space, and a combined area of the first, second, third and fourth baffle portions that extends into the at least one of the first manifold and the second manifold may be the same as the area of the quadrangle-shaped space.

At least one of the first manifold and the second manifold may form a quadrangle-shaped space in a plane perpendicular to the stacking direction, the baffle includes a first baffle portion, a second baffle portion, a third baffle portion and a fourth baffle portion that each have a quadrangle shape corresponding to a quarter of the quadrangle space, each of the first, second, third and fourth baffle portions being attached to the separator at one-half of a respective side of the quadrangle-shaped space, and a combined area of the first, second, third and fourth baffle portions that extends into the at least one of the first manifold and the second manifold may be the same as the area of the quadrangle-shaped space.

At least one of the above and other features and advantages may be realized by providing a separator of a fuel cell, comprising a first separator member having a fuel passage on a surface thereof and a second separator member having an oxidant passage on a surface thereof. The first separator member and the second separator member may be attached to each other at a surface of the first separator member on an opposite side of the first separator member from the surface having the fuel passage and at a surface of the second separator member on an opposite side of the second separator member from the surface having the oxidant passage. A first manifold penetrates the first separator member and the second separator member and is fluidly connected to the fuel passage of the first separator member, and a second manifold penetrates the first separator member and the second separator member and is fluidly connected to the oxidant passage of the second separator member. A baffle is disposed in at least one of the first manifold and the second manifold to control a fluid flow inside the at least one of the first manifold and the second manifold, at least one portion of the baffle being disposed between the first separator member and the second separator member, and another portion of the baffle extending into the at least one of the first manifold and the second manifold.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
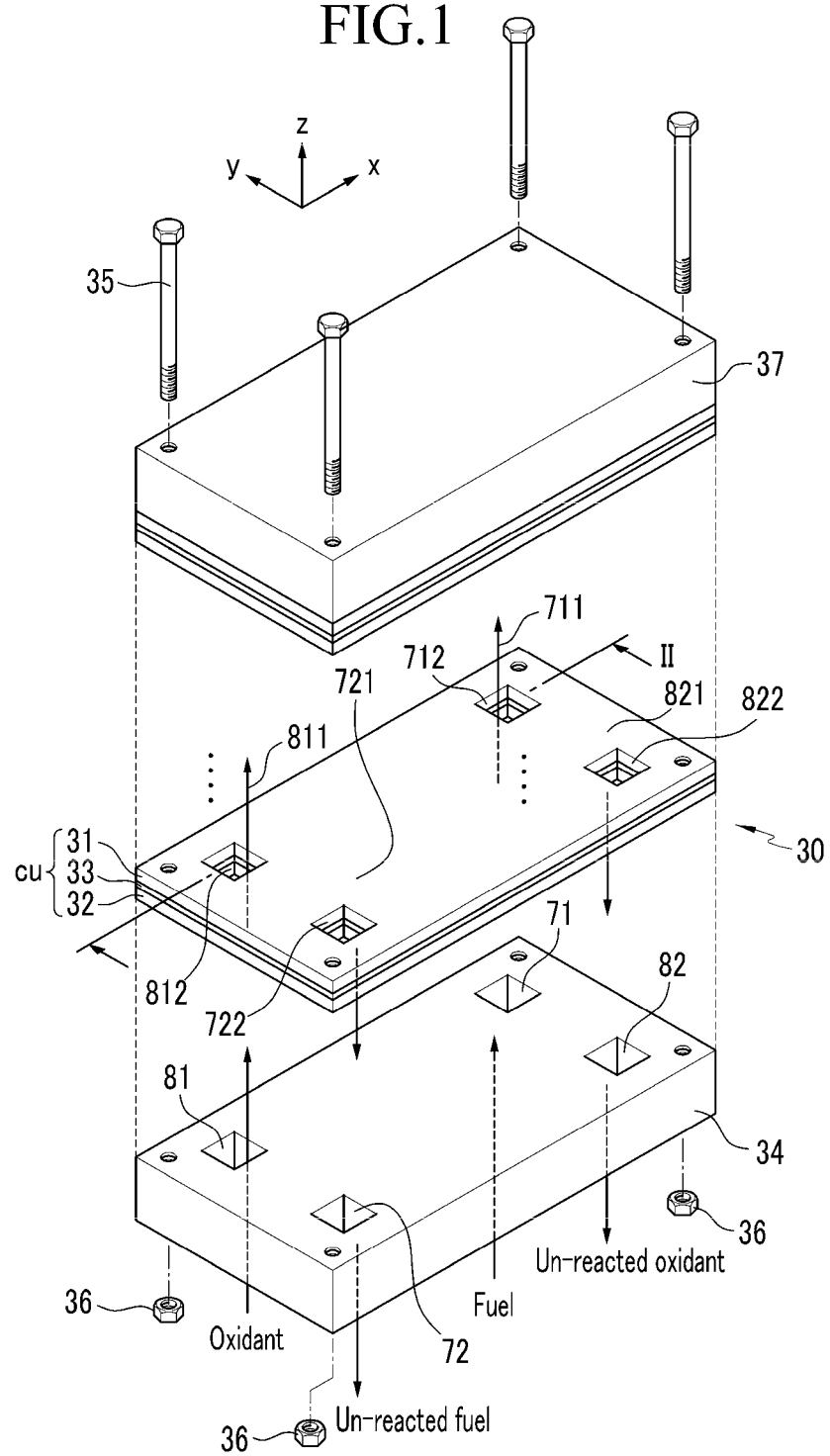
FIG. 1 illustrates an exploded perspective view of a stack for a fuel cell system according to an exemplary embodiment.

Korean Patent Application No. 10-2010-0054974, filed on Jun. 10, 2010, in the Korean Intellectual Property Office, and entitled: "Stack for Fuel Cell System," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
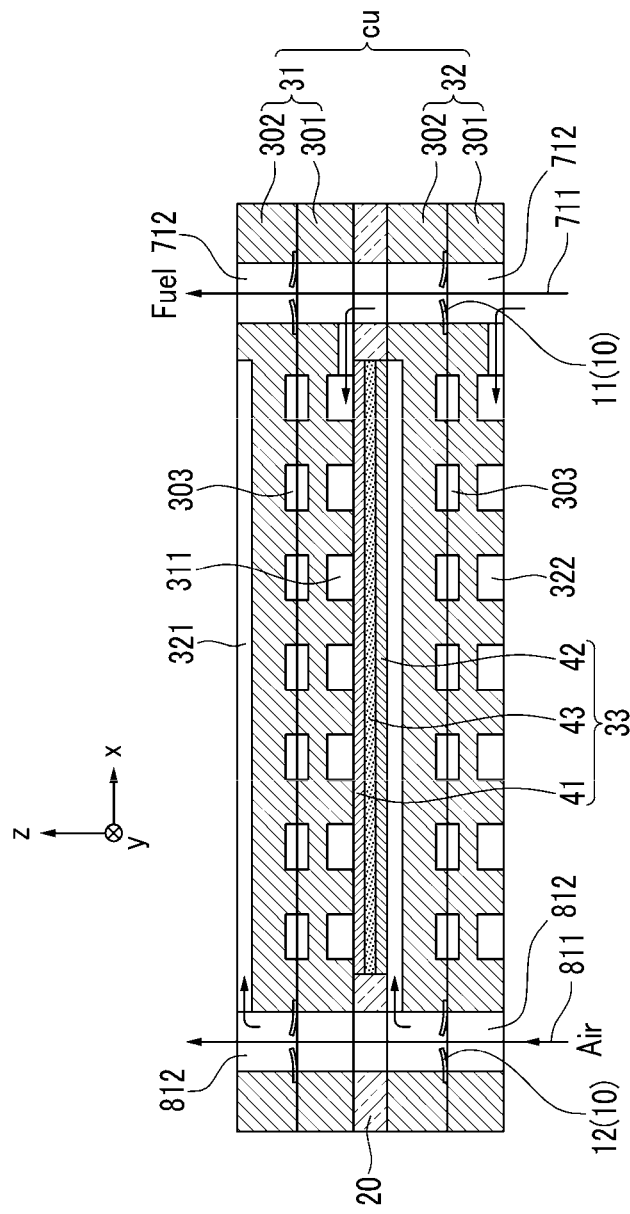
FIG. 2 illustrates a partial cross-sectional view of unit cell cut along II-II line in FIG. 1.

FIG. 1 is an exploded perspective view of a stack for a fuel cell system according to an exemplary embodiment, and FIG. 2 is a partial cross-sectional view of unit cell cut along II-II line in FIG. 1. Referring to FIG. 1 and FIG. 2, the stack 30 for the fuel cell system according to an exemplary embodiment is configured for producing power and heat by an electro chemical reaction of hydrogen and oxygen, in which the fuel containing hydrogen may be supplied from a fuel supplying unit (not shown) and oxidant, for example air containing oxygen, may be supplied from an oxidant supplying unit (not shown).

The stack 30 may include a membrane electrode assembly (hereinafter referred to as an "MEA") 33, a pair of separators 31 and 32 (hereinafter referred to, for convenience sake, as the "first separator" and the "second separator") disposed at respective sides of the MEA 33, and end plates 34 and 37 disposed at respective ends of the stack. The first separator 31, MEA 33 and the second separator, 32 may form a unit cell CU that provides power. To form the stack 30, alternating MEAs and separators may be stacked the z-axis direction. The first separator 31, MEA 33 and the second separator 32 may each have a generally planar configuration in the x-y plane, as shown in FIG. 1. In such a case, when MEAs and separators are stacked upon each other in an alternating manner, the stack extends in the z-axis direction, as shown in FIGS. 1 and 2. The MEA 33 may include a polymer electrolyte membrane 43 that transfers hydrogen ions, and an anode electrode 41 and a cathode electrode 42 that are included at respective sides of the electrolyte membrane 43.

Figure 3:
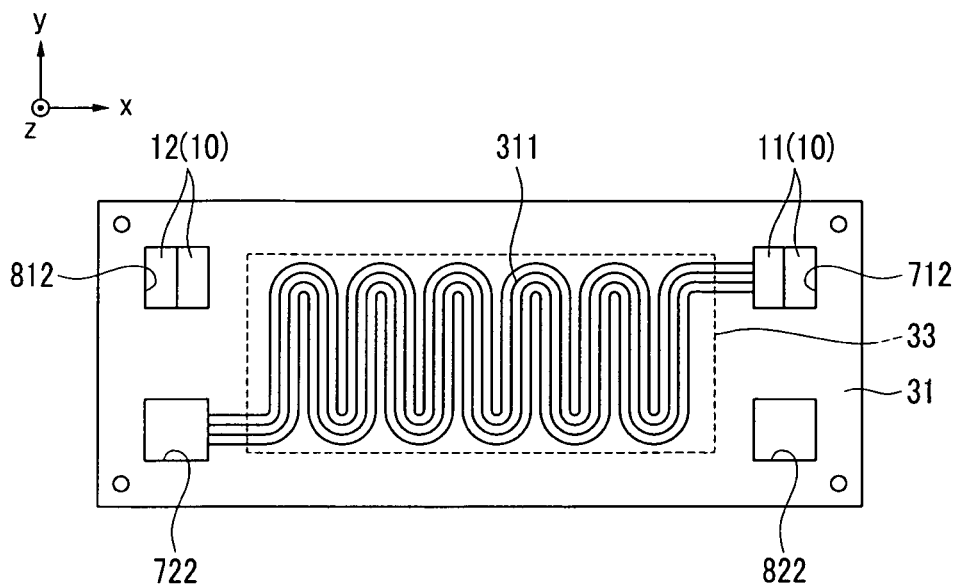
FIG. 3 illustrates a plan view of the location relationship of an MEA about a fuel passage, and the fuel inflow manifold and the oxidant inflow manifold of the separator in FIG. 2.

FIG. 3 is a plan view illustrating the location of an MEA 33 with respect to a fuel passage, the fuel inflow manifold and the oxidant inflow manifold of the separator 31 in FIG. 2. Referring to FIG. 2 and FIG. 3, the first separator 31 may supply a fuel to the anode electrode 41 of the MEA 33 through a fuel passage 311 that is located at one side of the separator 31.

Figure 4:
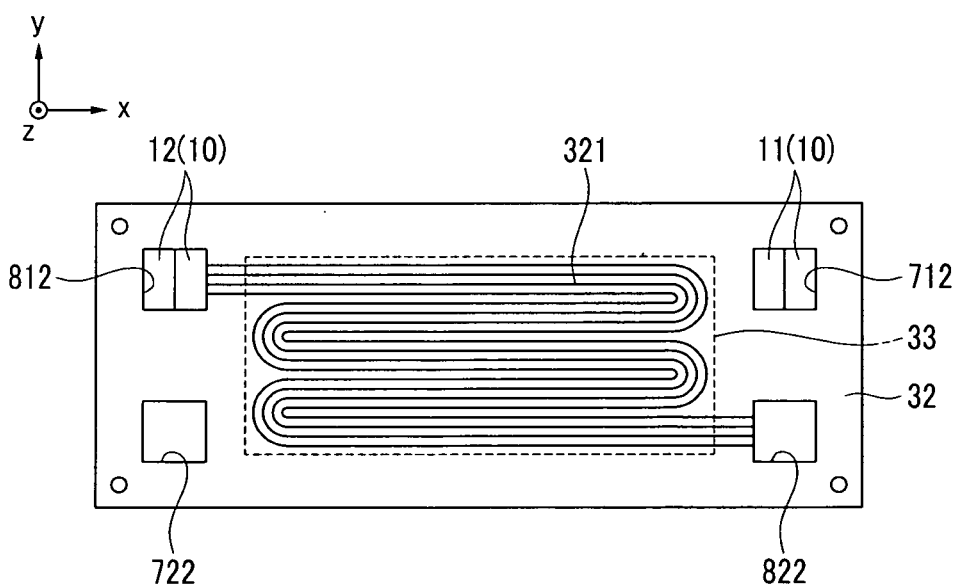
FIG. 4 illustrates a plan view of the location relationship of MEA about the oxidant passage, and the fuel inflow manifold and the oxidant inflow manifold of the separator in FIG. 2.

FIG. 4 is a plan view illustrating the location of the MEA 33 with respect to the oxidant passage, the fuel inflow manifold and the oxidant inflow manifold of the separator 32 in FIG. 2. Referring to FIG. 2 and FIG. 4, the second separator 32 may supply oxidant through an oxidant passage 321 to the cathode electrode 42 of the MEA 33 that is located on the opposite side of electrolyte membrane 43 from the anode electrode 41.

The first and second separators 31 and 32 may form the fuel passage 311 and the oxidant passage 321, respectively, based on the one MEA 33. When a fuel cell stack is formed with a plurality of MEAs, the first and second separators 31 and 32 may each have same structure. For example, as shown in FIG. 2, the separators in a stack, such as first and second separators 31 and 32, may each have a fuel passage 311 at one side to deliver fuel to the anode of an MEA, such as the anode 41 of MEA 33 adjacent to the separator 31. An oxidant passage on an opposite side of the separator, such as oxidant passage 321 of the separator 31, may deliver an oxidant to an adjacent MEA (not shown) stacked on the separator.

A separator, such as the first and second separators 31 and 32, may include a first separator member 301 and a second separator member 302 that are adhered to each other. The first separator member 301 may include the fuel flow channels 311 on a surface of the first separator member 301 opposite to a surface of the first separator member 301 where the first separator member 301 and the second separator member 302 are joined, and the second separator member 302 may include the oxidant flow channels 321 on a surface of the second separator member 302 opposite to a surface of the second separator member 302 where the first separator member 301 and the second separator member 302 are joined. When joined together, the first separator member 301 and the second separator member 302 may form a coolant passage 303 that allows a coolant to flow between the first and second members 301 and 302. The first separator member 301 may form the fuel passage 311 in the opposite side of the coolant passage 303, and the second separator member 302 may form the oxidant passage 321 in the opposite side of the coolant passage 303.

Again referring to FIG. 1, a plurality of unit cells (CU) may form a stack, and end plates 34 and 37 may be disposed at respective opposite sides of the stack in the stacking direction (z-axis direction). The stack may be held together with tightening bolts 35 and corresponding nuts 36. As a result, the unit cells (CU) and end plates 34 and 37 may form a unit stack 30

The end plate 34 may include a fuel inflow inlet 71 that supplies fuel to the fuel passage 311 of the first separator 31 by connecting the fuel supplying unit, an un-reacted fuel outlet 72 that discharges the un-reacted fuel from the fuel passage 311, a oxidant inflow inlet 81 that is connected to the oxidant supplying unit and supplies oxidant to the oxidant passage 321 of the second separator 32, and an un-reacted oxidant outlet 82 that discharges the un-reacted oxidant from the oxidant passage 321.

Referring to FIG. 2 to FIG. 4, the first and second separators 31 and 32 may form a first manifold (hereinafter referred to as "a fuel inflow manifold") 711, a second manifold (hereinafter referred to as "an oxidant inflow manifold") 811, a third manifold (hereinafter referred to as "a un-reacted fuel discharge manifold") 721 and a fourth manifold (hereinafter referred to as "an un-reacted oxidant discharge manifold") 821 that extend through the stack in the stacking direction (z-axis direction) from the outside.

The fuel inflow manifold 711 may be formed by the connection or alignment of first penetration holes (hereinafter referred to individually as "a fuel inflow penetration hole") 712 that extend through first and second separator members 301, 302 in the z-axis direction. In an assembled stack, the first penetration holes 712 of the stacked separators may align such that the fuel inflow manifold 711 extends through the stack. The fuel inflow manifold 711 may provide for a fuel to flow into the fuel cell stack and allows the fuel to be directed to the anodes 41 of the MEAs 33 by connecting the fuel inflow inlet 71 to the fuel passage 311 of the separator 31 (see FIGS. 1-3). The oxidant inflow manifold 811 may be formed by the connection or alignment of second penetration holes (hereinafter referred to individually as "an oxidant inflow penetration hole") 812 that extend through the first and separator members 301, 302 in the z-axis direction. In an assembled stack, the second penetration holes 812 of the stacked separators may align such that the oxidant inflow manifold 811 may extend through the stack. The oxidant inflow manifold 811 may provide for an oxidant to flow into the fuel cell stack and allow the oxidant to be directed to the cathodes 42 of the MEAs 33 by connecting the oxidant inflow inlet 81 to the oxidant passage 321 of the separator 31 (see FIGS. 1-2 and 4).

The un-reacted fuel discharge manifold 721 may be formed by the connection or alignment of third penetration holes (hereinafter referred to individually as "an un-reacted fuel discharge penetration hole") 722 that extend through the first and second separator members 301, 302 in the z-axis direction. In an assembled stack, the un-reacted fuel discharge penetration holes 722 of the stacked separators may align such that the un-reacted fuel discharge manifold 721 extends through the stack. The un-reacted fuel discharge manifold 721 may allow un-reacted fuel to be discharged to the outside of the stack 30 by connecting the un-reacted fuel outlet 72 to the fuel passage 311 of the separator 31 (see FIG. 1).

The un-reacted oxidant discharge manifold 821 may be formed by the connection or alignment of a fourth penetration holes (hereinafter referred to individually as "an un-reacted oxidant discharge penetration hole") 822 that extend through the first and second separator members 301, 302 in the z-axis direction. In an assembled stack, the un-reacted oxidant discharge penetration holes 822 of the stacked separators may align such that the un-reacted oxidant discharge manifold 821 extends through the stack. The un-reacted oxidant discharge manifold 821 may allow the un-reacted oxidant to be discharged to the outside of the stack 30 by connecting the oxidant passage 321 to the un-reacted oxidant outlet 82 (see FIG. 1).

In the present embodiment, the first, second, third, and fourth manifolds 711, 811, 721, 821 are each in the form of a quadrangle-shaped space in xy plane (that is, in the plane that is perpendicular to the z-axis direction). However, it is to be understood that the first, second, third, and fourth manifolds 711, 811, 721, 821 may have other shapes. For example, the shape of the first, second, third, and fourth manifolds 711, 811, 721, 821 in the xy plane may be a circle, triangle, pentagon, hexagon, or octagon (not shown).

Referring to FIG. 2, a gasket 20 may be disposed between the first and second separators 31 and 32 to seal an area surrounding the MEA 33. The gasket 20 may allow the fuel inflow penetration holes 712 to be connected only to the fuel inflow manifold 711, and the oxidant inflow penetration holes 812 to be connected only to the oxidant inflow manifold 811. In addition, the gasket 20 may allow the un-reacted fuel discharge penetration holes 722 to be connected only to the un-reacted fuel discharge manifold 721, and the un-reacted oxidant discharge penetration holes 822 to be connected only to the un-reacted oxidant inflow manifold 821 (see FIG. 1). The gasket 20 may be made of any suitable gasket material such as, for example, polyvinyl chloride or polyethylene terephthalate.

In the stack 30 of an exemplary embodiment, the first and second separators 31 and 32 may include a baffle 10 formed in the fuel inflow manifold 711 and/or the oxidant inflow manifold 811. The baffle 10 may reduce or prevent a curve flow phenomenon. The baffle 10 may control a fuel or oxidant flow to be in a straight line in the fuel inflow manifold 711 or the oxidant inflow manifold 811. The baffle 10 may help to provide a uniform distribution of fuel or oxidant. In the present embodiment, the baffles 10 are disposed in both the fuel inflow manifold 711 and the oxidant inflow manifold 811. However, in another embodiment, the baffle 10 may be disposed in only one of the fuel inflow manifold 711 and the oxidant inflow manifold 811.

The baffle 10 may be made of a flexible material. The baffle 10 may have fluidity properties or rheological properties. The baffle 10 may control the flow of oxidant or fuel while minimizing the flow resistance of the oxidant or fuel. The baffle 10 may be made of the same material as the gasket 20. As a specific, non-limiting example, the baffle 10 may be made of polyvinyl chloride or polyethylene terephthalate.

As shown in FIG. 2, a first baffle member 11 may be disposed in the fuel inflow penetration holes 712 of the fuel inflow manifold 711 and a second baffle member 12 may be disposed in the oxidant inflow penetration holes 812 of the oxidant inflow manifold 811.

Without being bound to any particular theory, the first baffle 11 may control the fuel flow inside the fuel inflow penetration holes 712 and the fuel inflow manifold 711 to be in a straight line, and may reduce or prevent a curve flow phenomenon, so that the first baffle 11 may allow the distribution of the fuel to be uniform. Therefore, the distribution of a fuel that is directed to the fuel passage 311 of each unit cell CU may be made uniform. The second baffle 12 may control the oxidant flow inside the oxidant inflow penetration holes 812 and the oxidant inflow manifold 811 to be in a straight line, and may reduce or prevent the curve flow phenomenon, so that the second baffle 12 may allow the distribution of oxidant to be uniform. Therefore, the distribution of oxidant that is directed to the oxidant passage 321 of each unit cell CU may be made uniform.

For convenience and ease of description, the baffle 10 including the first baffle 11 and the second baffle 12 will be described with reference only to the first baffle 11. It is to be understood that description of the configuration and structure of the first baffle 11 in the fuel inflow manifold 711 may apply as well to the second baffle 12 in the oxidant inflow manifold 811. Moreover, the term "disposed manifold" may be used herein to refer to a manifold when a general description or recitation is provided of a baffle that is disposed in the manifold, and where there is no need to specify whether the manifold is a fuel inflow manifold or an oxidant inflow manifold. In other words, the term "disposed manifold" refers to a manifold having a baffle disposed therein.

The first baffle 11 may be implemented in various structures according to the configurations of the first and the second separators 31 and 32. For example, if the first and second separators 31 and 32 are each made up of first and second members 301 and 302, as shown if FIG. 2, one end of the first baffle 11 may be disposed between the first separator member 301 and the second separator member 302 and the other end of the first baffle 11 may extend to the inside of the fuel inflow manifold 711. Since the first separator member 301 and the second separator member 302 may be tightly adhered to each other, for example, by the mechanical force exerted by the tightening bolts 35 and nuts 37, the first baffle 11 may be held in place in the fuel inflow manifold 711 by having one end of the baffle 11 disposed between the first separator member 301 and the second separator member 302.

Moreover, although FIG. 2 shows that first baffles 11 are disposed in the fuel inflow manifold 711 corresponding to each of the separators 31 and 32, and second baffles 12 are disposed in the oxidant inflow manifold 811 corresponding to each of the separators 31 and 32, it is not required that baffles 11 and 12 be disposed with respect to every separator in a fuel cell stack.

Figure 5:
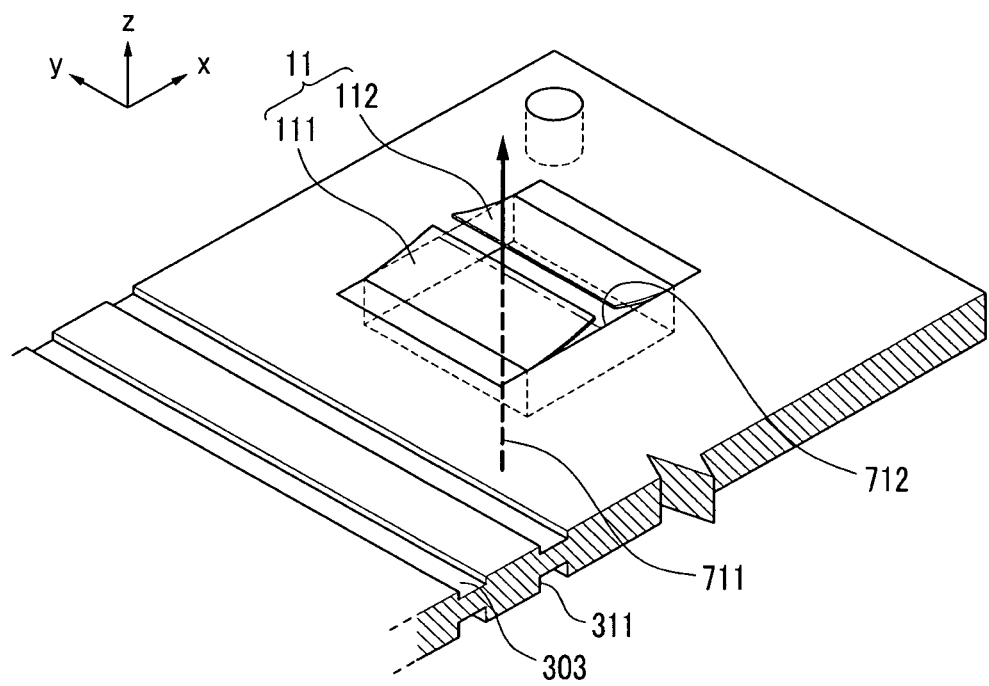
FIG. 5 illustrates a perspective view of an exemplary embodiment of the baffle disposed in the fuel inflow or oxidant inflow manifold.

FIG. 5 is a perspective view of an exemplary embodiment of the first baffle 11 disposed in the fuel inflow penetration hole 712 of the manifold. (As stated above, the configuration, in which the first baffle 11 is disposed in the fuel inflow penetration hole 712 of the fuel inflow manifold 711, and the configuration, in which the second baffle 12 is disposed in the oxidant inflow penetration hole 812 of the oxidant inflow manifold 811, may be the same.)

Referring to FIG. 5, the fuel inflow manifold 711 may form a quadrangle-shaped space about the xy plane. The first baffle 11 of the exemplary embodiment of FIG. 5 may include a first baffle portion 111 and a second baffle portion 112 that each have a bisected quadrangle shape and that are attached to the separator at opposite sides of the quadrangle-shaped space of the fuel inflow manifold 711. The first baffle portion 111 and the second baffle portion 112 may be disposed on respective sides of the quadrangle-shaped space, and the total combined area of the first baffle portion 111 and second baffle portion 112 that extends into the fuel inflow manifold 711 may be the same as or smaller than the area of the quadrangle space. Each of the first baffle portion 111 and second baffle portion 112 may be disposed on the first separator member 301 such that one end of each of the first baffle portion 111 and second baffle portion 112 contacts the first separator 301 and another end of each of the first baffle portion 111 and second baffle portion 112 extends into the quadrangle-shaped space of the fuel inflow manifold 711. In the assembled separator 31, in which the first separator member 301 and the second separator member 302 are adhered to each other, the one end of each of the first baffle portion 111 and second baffle portion 112 also contacts the second separator member 302 such that the one end of each of the first baffle portion 111 and second baffle portion 112 is held in place between the first separator member 301 and the second separator member 302. The other end of each of the first baffle portion 111 and second baffle portion 112 that extends into the quadrangle-shaped space is free to bend, for example, by the flow force of fuel.

When fuel does not flow through the fuel inflow manifold 711, the first baffle portion 111 and second baffle portion 112 may form a structure that closes the fuel inflow penetration hole 712 (an imaginary line state in FIG. 5). When fuel flows through the fuel inflow manifold 711, the flow force of the fuel bends the flexible material of the first baffle portion 111 and second baffle portion 112 to provide an opening for the fuel (a solid line state in FIG. 5). A curve flow phenomenon may be reduced or prevented by the effect of the first baffle portion 111 and second baffle portion 112 and the fuel flow may be controlled to be in a straight line.

Figure 6:
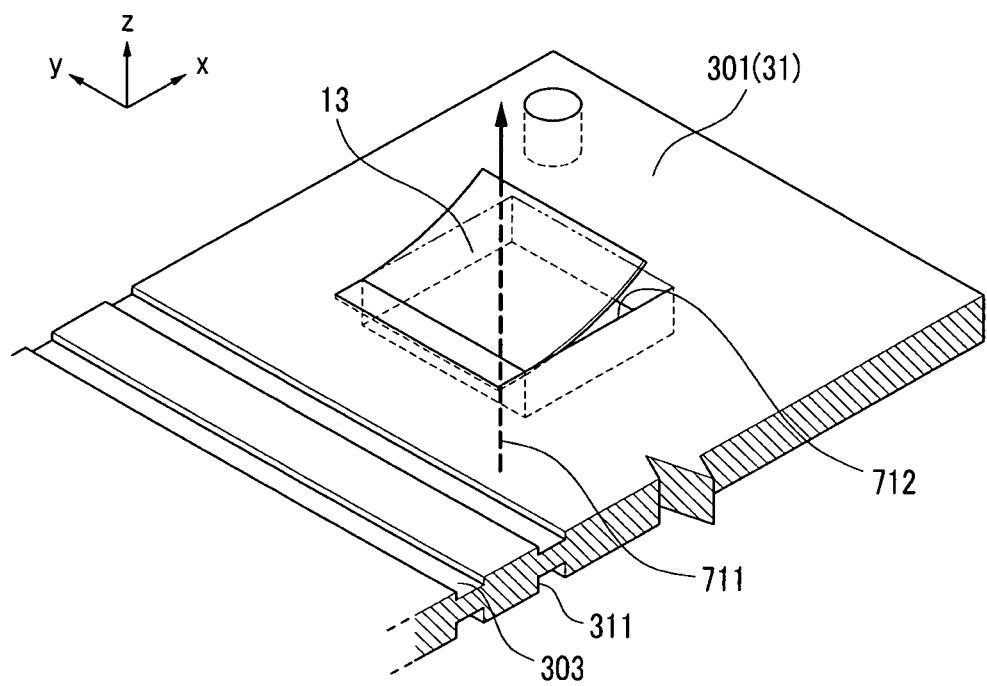
FIG. 6 illustrates a perspective view of another exemplary embodiment of the baffle disposed in the fuel inflow or oxidant inflow manifold.

FIG. 6 is a perspective view of another exemplary embodiment of the baffle disposed in the fuel inflow or oxidant inflow manifold. Referring to FIG. 6, a baffle 13 of the exemplary embodiment of FIG. 6 may be formed by a single member, which may be attached to the separator 31 at one side of the quadrangle-shaped space of the fuel inflow manifold 711 and extend into the quadrangle-shaped space. The area that extends into the fuel inflow manifold 711 may be the same as or smaller than the area of the quadrangle-shaped space. The baffle 13 may be disposed on the first separator member 301 such that one end of the baffle 13 contacts the first separator member 301 and another end of the baffle 13 extends into the quadrangle-shaped space of the fuel inflow manifold 711. In the assembled separator 31, in which the first separator member 301 and the second separator member are adhered to each other, the one end of the baffle 13 may also contact the second separator member 302 such that the one end of the baffle 13 is held in place between the first separator member 301 and the second separator member 302. The other end of the baffle 13 that extends into the quadrangle-shaped space may be free to bend, for example, by the flow force of fuel.

When a fuel does not flow through the fuel inflow manifold 711, the baffle 13 may form a structure that closes the fuel inflow penetration hole 712 (an imaginary line state in FIG. 6); when a fuel flows through the fuel inflow manifold 711, the flow force of the fuel may bend the flexible material of the baffle 13 to provide an opening for the fuel to flow (a solid line state in FIG. 6). A curve flow phenomenon may be reduced or prevented by the effect of the baffle 13, and the fuel flow may be controlled to be in a straight line.

Figure 7:
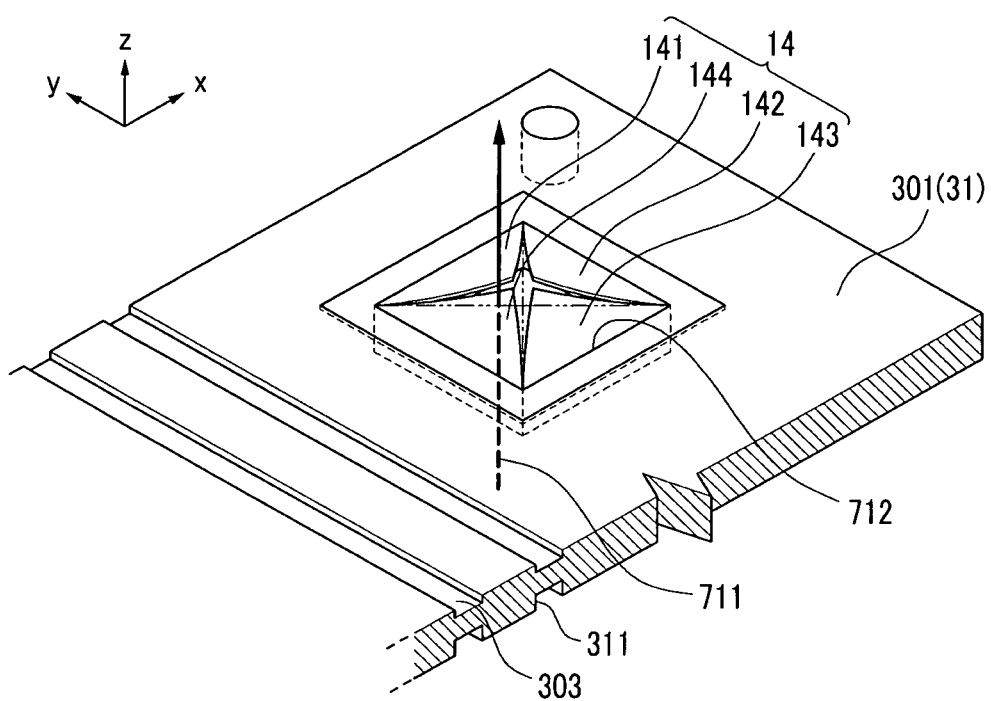
FIG. 7 illustrates a perspective view of another exemplary embodiment of the baffle disposed in the fuel inflow or oxidant inflow manifold.

FIG. 7 is a perspective view of another exemplary embodiment of the baffle disposed in the fuel inflow or oxidant inflow manifold. Referring to FIG. 7, a baffle 14 of the exemplary embodiment of FIG. 7 may include a first baffle portion 141, a second baffle portion 142, a third baffle portion 143 and a fourth baffle portion 144 that are each formed in triangle shape corresponding to one-quarter of the quadrangle-shaped space of the fuel inflow manifold 711. Each of the first baffle portion 141, second baffle portion 142, third baffle portion 143 and fourth baffle portion 144 may be attached to the separator at a respective side of the quadrangle-shaped space. The total combined area of the first baffle portion 141, second baffle portion 142, third baffle portion 143 and fourth baffle portion 144 that extends to the fuel inflow manifold 711 may be the same as or smaller than the area of the quadrangle-shaped space. The baffle 14 may be formed as a sheet of flexible material that is disposed on the first separator member 301 to overlap the quadrangle-shaped space of the fuel inflow manifold 711. In the assembled separator 31, in which the first separator member 301 and the second separator member 302 are adhered to each other, the periphery of the baffle 14 may also contact the second separator member 302 such that the periphery end of the baffle 14 is held in place between the first separator member 301 and the second separator member 302. The portion of the baffle 14 that extends into the quadrangle-shaped space may be cut diagonally to form the first baffle portion 141, second baffle portion 142, third baffle portion 143 and fourth baffle portion 144 which may be free to bend by the flow force of fuel.

When a fuel does not flow through the fuel inflow manifold 711, the first baffle portion 141, second baffle portion 142, third baffle portion 143 and fourth baffle portion 144 may form a structure that closes the fuel inflow penetration hole 712 (the imaginary line state in FIG. 7); when a fuel flows through the fuel inflow manifold 711, the flow force of the fuel may bend the flexible material of first baffle portion 141, second baffle portion 142, third baffle portion 143 and fourth baffle portion 144 to provide an opening for the fuel to flow (a solid line stat in FIG. 7). A curve flow phenomenon may be reduced or prevented by the effect of first baffle portion 141, second baffle portion 142, third baffle portion 143 and fourth baffle portion 144 to control the fuel flow to be in a straight line.

Figure 8:
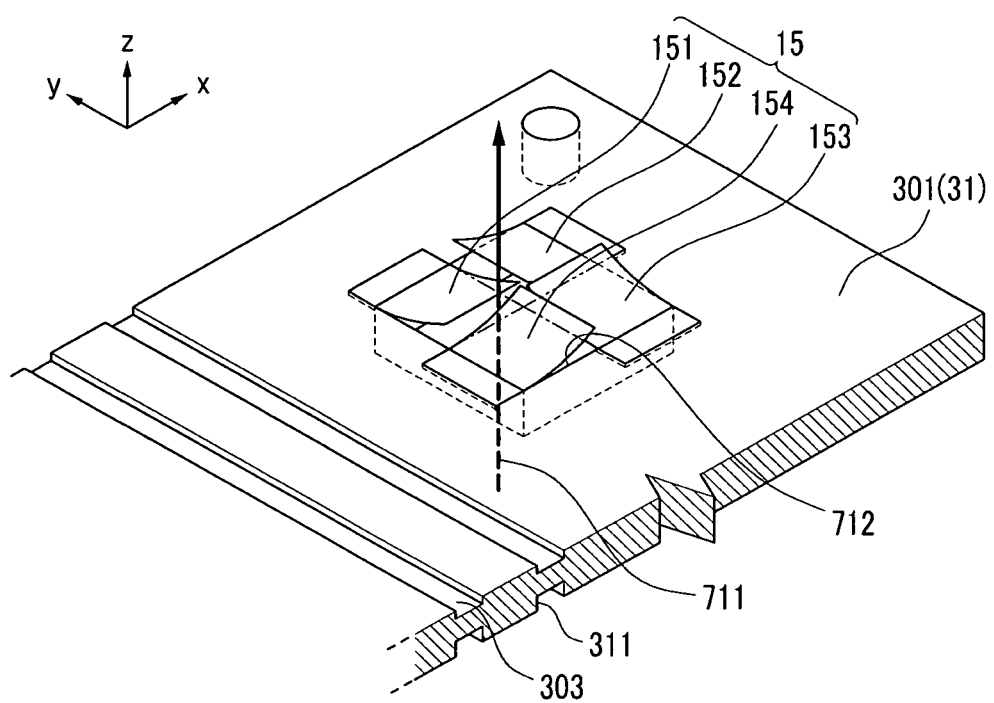
FIG. 8 illustrates a perspective view of another exemplary embodiment of the baffle disposed in the fuel inflow or oxidant inflow manifold.

FIG. 8 is a perspective view of another exemplary embodiment of the baffle disposed in the fuel inflow or oxidant inflow manifold. Referring to FIG. 8, a baffle 15 of the embodiment of FIG. 8 may include a first baffle portion 151, second baffle portion 152, third baffle portion 153 and fourth baffle portion 154 that are each formed in a quadrangle shape corresponding to one-quarter of the fuel inflow manifold 711. The first baffle portion 151, second baffle portion 152, third baffle portion 153 and fourth baffle portion 154 may each be disposed at one-half of a respective side of the quadrangle-shaped space. The total combined area of the first baffle portion 151, second baffle portion 152, third baffle portion 153 and fourth baffle portion 154 that extends into the fuel inflow manifold 711 may be the same as or smaller than the area of the quadrangle-shaped space. Each of first baffle portion 151, second baffle portion 152, third baffle portion 153 and fourth baffle portion 154 may be disposed on the first separator member 301 such that one end of each of the first baffle portion 151, second baffle portion 152, third baffle portion 153 and fourth baffle portion 154 contacts the first separator 301 and another end of each of first baffle portion 151, second baffle portion 152, third baffle portion 153 and fourth baffle portion 154 extends into the quadrangle-shaped space of the fuel inflow manifold 711. In the assembled separator 31, in which the first separator member 301 and the second separator member are adhered to each other, the one end of each of first baffle portion 151, second baffle portion 152, third baffle portion 153 and fourth baffle portion 154 may also contact the second separator member 302 such that the one end of each of first baffle portion 151, second baffle portion 152, third baffle portion 153 and fourth baffle portion 154 is held in place between the first separator member 301 and the second separator member 302. The other end of each of first baffle portion 151, second baffle portion 152, third baffle portion 153 and fourth baffle portion 154 that extends into the quadrangle-shaped space may be free to bend by the flow force of fuel.

When fuel does not flow through the fuel inflow manifold 711, first baffle portion 151, second baffle portion 152, third baffle portion 153 and fourth baffle portion 154 may form a structure that closes the fuel inflow penetration hole 712 (the imaginary line state in FIG. 8). When fuel flows through the fuel inflow manifold 711, the flow force of the fuel may bend the flexible material of first baffle portion 151, second baffle portion 152, third baffle portion 153 and fourth baffle portion 154 to provide an opening for the fuel to flow (a solid line state in FIG. 8). A curve flow phenomenon may be reduced or prevented by the effect of first baffle portion 151, second baffle portion 152, third baffle portion 153 and fourth baffle portion 154 to control the fuel flow to be in a straight line.

If a stack that does not include baffles as described above is operated for a long time, the unit cells in a specific location in the stack may become degraded. Without being bound to any particular theory, it is believed that this effect is because of a curve flow phenomenon, in which a fuel or oxidant is flowed in a curved line or zigzag state in the fuel inflow or oxidant inflow manifold. Because the curve flow phenomenon makes the distribution of a fuel or oxidant to be unequal in the whole range of the manifold along the stacking direction by forming a backward flow or turbulent flow in the fuel inflow or the oxidant inflow manifold, excess fuel or oxidant may be supplied to some unit cells and at the same time, some other unit cells may be deficient in a fuel or oxidant. As a result, a voltage deviation between the unit cells may be increased, and a performance and durability of the stack may be deteriorated.

According to the exemplary embodiments described herein, there may be an effect that the distribution of a fuel or oxidant that is supplied to the inside of the fuel inflow or the oxidant inflow manifold may be controlled to be more uniform by preventing the curve flow phenomenon and the fuel or oxidant flow may be controlled to be in a straight line, using baffle(s) in the fuel inflow or the oxidant inflow manifold. Because of the uniform distribution of fuel or oxidant supplied, a voltage deviation between the unit cells may be decreased, and a performance and durability of the stack may be improved.

<Description of symbols>

| | |
|---|---|
| 10, 13, 14, 15: Baffle | 11, 12: First and second baffle member |
| 20: Gasket | 30: Stack |
| 31, 32: First and second separator | |
| 33: Membrane electrode assembly (MEA) | |
| 34, 37: End plate | 35: Tightening bolt |
| 36: Nut | 41: Anode electrode |
| 42: Cathode electrode | 43: Electrolyte membrane |
| 71: Fuel inflow inlet | 72: Un-reacted fuel outlet |

| <Description of symbols> | |
|---|---|
| 81: Oxidant inflow inlet | 82: Un-reacted oxidant outlet |
| 111, 112: First baffle portion and Second baffle portion of the embodiment of FIG. 5 | |
| 141, 142, 143, 144: First baffle portion 141, Second baffle portion 142, Third baffle portion 143 and Fourth baffle portion 144 of the embodiment of FIG. 7 | |
| 151, 152, 153, 154: First baffle portion 141, Second baffle portion 142, Third baffle portion 143 and Fourth baffle portion 144 of the embodiment of FIG. 8 | |
| 301, 302: First and second separator member | |
| 303: Coolant passage | |
| 311: Fuel passage | 321: Oxidant passage |
| 711: First manifold (Fuel inflow manifold) | |
| 712, 812, 722, 822: First, second, third, and fourth penetration hole | |
| 721: Third manifold (Un-reacted fuel discharge manifold) | |
| 811: Second manifold (Oxidant inflow manifold) | |
| 821: Fourth manifold (Un-reacted oxidant discharge manifold) | |
| CU: Unit cell | |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A stack for a fuel cell system, comprising:
a membrane electrode assembly that includes an anode electrode and a cathode electrode disposed on respective sides of a polymer electrolyte membrane;
a separator that includes a fuel passage that supplies a fuel to the anode electrode disposed on one side of the membrane electrode assembly in a stacking direction, or an oxidant passage that supplies an oxidant to the cathode electrode disposed on the other side of the membrane electrode assembly in the stacking direction; and
end plates disposed at respective ends of the stack in the stacking direction,
wherein the separator includes:
a first manifold formed by connecting first penetration holes that penetrate the separator in the stacking direction and that is connected to the fuel passage;
a second manifold formed by connecting second penetration holes that penetrate the separator in the stacking direction and that is connected to the oxidant passage; and
a baffle that is disposed in at least one of the first manifold and the second manifold, the baffle having a membrane structure and extending to the inside of the at least one of the first manifold and the second manifold,
wherein:
the at least one of the first manifold and the second manifold forms a quadrangle-shaped space in a plane perpendicular to the stacking direction,
the baffle includes a first baffle portion, a second baffle portion, a third baffle portion and a fourth baffle portion that each have a triangle shape, each triangle shape corresponding to a quarter of the quadrangle-shaped space, each of the first, second, third and fourth baffle portions being attached to the separator at a respective side of the quadrangle-shaped space, and
a combined area of the first, second, third and fourth baffle portions that extends into the at least one of the first manifold and the second manifold is the same as the area of the quadrangle-shaped space.

2. The stack for the fuel cell system as claimed in claim 1, wherein:
the baffle is made of a flexible material.

3. The stack for the fuel cell system as claimed in claim 1, wherein:
the baffle is disposed between a pair of adjacent separators and is made of the same material as a gasket that seals the circumference of the membrane electrode assembly.

4. The stack for the fuel cell system as claimed in claim 1, wherein:
the baffle is made of one or more of polyvinyl chloride and polyethylene terephthalate.

5. The stack for the fuel cell system as claimed in claim 1, wherein:
the baffle includes:
a first baffle member that is disposed in the first penetration hole of the first manifold; and
a second baffle member that is disposed in the second penetration hole of the second manifold.

6. The stack for the fuel cell system as claimed in claim 1, wherein:
the separator includes: a first separator member and a second separator member that are adhered to each other in the stacking direction and that form a coolant passage that extends between the first separator member and the second separator member perpendicular to the stacking direction; and
one end of each of the first baffle portion, the second baffle portion, the third baffle portion and the fourth baffle portion is disposed between the first separator member and the second separator member, and the other end of each of first baffle portion, the second baffle portion, the third baffle portion and the fourth baffle portion extends into the inside of at least one of the first manifold and the second manifold.

7. The stack for the fuel cell system as claimed in claim 6, wherein:
the first separator member includes the fuel passage on the opposite side of the first member from the coolant passage, and
the second separator member includes the oxidant passage on the opposite side of the second separator member from the coolant passage.

8. A stack for the fuel cell system, comprising:
a membrane electrode assembly that includes an anode electrode and a cathode electrode disposed on respective sides of a polymer electrolyte membrane;
a separator that includes a fuel passage that supplies a fuel to the anode electrode disposed on one side of the membrane electrode assembly in a stacking direction, or an oxidant passage that supplies an oxidant to the cathode electrode disposed on the other side of the membrane electrode assembly in the stacking direction; and
end plates disposed at respective ends of the stack in the stacking direction,
wherein the separator includes:
a first manifold formed by connecting first penetration holes that penetrate the separator in the stacking direction and that is connected to the fuel passage;
a second manifold formed by connecting second penetration holes that penetrate the separator in the stacking direction and that is connected to the oxidant passage; and
a baffle that is disposed in at least one of the first manifold and the second manifold, the baffle having a membrane structure and extending to the inside of the at least one of the first manifold and the second manifold, wherein:
the at least one of the first manifold and the second manifold forms a quadrangle-shaped space in a plane perpendicular to the stacking direction,
the baffle includes a first baffle portion, a second baffle portion, a third baffle portion and a fourth baffle portion that each have a quadrangle shape corresponding to a quarter of the quadrangle space, each of the first, second, third and fourth baffle portions being attached to the separator at one-half of a respective side of the quadrangle-shaped space, and
a combined area of the first, second, third and fourth baffle portions that extends into the at least one of the first manifold and the second manifold is the same as the area of the quadrangle-shaped space.

9. The stack for the fuel cell system as claimed in claim 8, wherein:
the baffle is made of a flexible material.

10. The stack for the fuel cell system as claimed in claim 8, wherein:
the baffle is disposed between a pair of adjacent separators and is made of the same material as a gasket that seals the circumference of the membrane electrode assembly.

11. The stack for the fuel cell system as claimed in claim 8, wherein:
the baffle is made of one or more of polyvinyl chloride and polyethylene terephthalate.

12. The stack for the fuel cell system as claimed in claim 8, wherein:
the baffle includes:
a first baffle member that is disposed in the first penetration hole of the first manifold; and
a second baffle member that is disposed in the second penetration hole of the second manifold.

13. The stack for the fuel cell system as claimed in claim 8, wherein:
the separator includes: a first separator member and a second separator member that are adhered to each other in the stacking direction and that form a coolant passage that extends between the first separator member and the second separator member perpendicular to the stacking direction; and
one end of each of the first baffle portion, the second baffle portion, the third baffle portion and the fourth baffle portion is disposed between the first separator member and the second separator member, and the other end of each of first baffle portion, the second baffle portion, the third baffle portion and the fourth baffle portion extends into the inside of at least one of the first manifold and the second manifold.

14. The stack for the fuel cell system as claimed in claim 13, wherein:
the first separator member includes the fuel passage on the opposite side of the first member from the coolant passage, and
the second separator member includes the oxidant passage on the opposite side of the second separator member from the coolant passage.

* * * * *